(12) United States Patent
Bonner et al.

(10) Patent No.: US 11,792,460 B2
(45) Date of Patent: *Oct. 17, 2023

(54) SYSTEMS AND METHODS TO FACILITATE QUALITY CONTROL OF BENEFIT ITEMS CREATED FOR SUBSCRIBERS OF A MEMBERSHIP PLATFORM

(71) Applicant: Patreon, Inc., San Francisco, CA (US)

(72) Inventors: George Edward Bonner, Oakland, CA (US); Jekabs Stikans, San Francisco, CA (US)

(73) Assignee: Patreon, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,809

(22) Filed: May 25, 2022

(65) Prior Publication Data

US 2022/0377399 A1 Nov. 24, 2022

Related U.S. Application Data

(63) Continuation of application No. 17/324,058, filed on May 18, 2021, now Pat. No. 11,368,735.

(51) Int. Cl.
*H04N 21/2543* (2011.01)
*H04N 21/262* (2011.01)
(Continued)

(52) U.S. Cl.
CPC ... *H04N 21/26225* (2013.01); *G06Q 30/0208* (2013.01); *H04N 21/2543* (2013.01); *H04N 21/26233* (2013.01)

(58) Field of Classification Search
None
See application file for complete search history.

(56) References Cited

U.S. PATENT DOCUMENTS 7,921,028 B2 4/2011 Cole
8,051,040 B2 11/2011 Johnson
(Continued)

FOREIGN PATENT DOCUMENTS

JP 2019191623 A 10/2019
WO 2009045899 A2 4/2009

OTHER PUBLICATIONS

Mattison, David, "Reality Check for the Muses: Creativity and Business Innovation Resources", Searcher; Medford vol. 16, Iss. 10, (Nov./Dec. 2008): 16-21, 55-59. (Year: 2008).

(Continued)

*Primary Examiner* — Brian T Pendleton
*Assistant Examiner* — Jean D Saint Cyr
(74) *Attorney, Agent, or Firm* — ESPLIN & ASSOCIATES, PC

(57) ABSTRACT

Systems and methods to facilitate quality control of benefit items created for subscribers of a membership platform are described herein. Exemplary implementations may: obtain subscribership information; obtain quality control information; effectuate presentation of a reward fulfillment user interface; obtain input information; calculate levels of quality of digital assets; determine sets of subscribership criteria that correspond to the calculated levels of quality; authorize fulfillment of physical benefit items; and/or perform other operations.

18 Claims, 6 Drawing Sheets

(51) Int. Cl.
  *H04N 21/442* (2011.01)
  *H04N 21/81* (2011.01)
  *G06Q 30/0208* (2023.01)

(56) References Cited

U.S. PATENT DOCUMENTS

| | | | |
|---|---|---|---|
| 8,375,024 | B2 | 2/2013 | Goeldi |
| 8,850,490 | B1 | 9/2014 | Thomas |
| 9,035,163 | B1 | 5/2015 | Mohajer |
| 9,060,249 | B2 | 6/2015 | Meredith |
| 9,558,277 | B2 | 1/2017 | Pappas |
| 9,734,521 | B2 | 8/2017 | Curtis |
| 9,767,208 | B1 | 9/2017 | Chow |
| 9,870,581 | B1 | 1/2018 | Vormweg |
| 10,356,574 | B1 | 7/2019 | Wood |
| 10,607,242 | B1* | 3/2020 | Wood ............... G06Q 30/0201 |
| 10,621,532 | B1 | 4/2020 | Conte |
| 10,936,986 | B2 | 3/2021 | Conte |
| 10,937,042 | B2 | 3/2021 | Wood |
| 11,049,191 | B1 | 6/2021 | Wilczek |
| 11,270,330 | B1 | 3/2022 | Brini |
| 2002/0036654 | A1 | 3/2002 | Evans |
| 2002/0103698 | A1 | 8/2002 | Cantrell |
| 2007/0038516 | A1 | 2/2007 | Apple |
| 2007/0069013 | A1 | 3/2007 | Seifert |
| 2007/0164554 | A1 | 7/2007 | Krone |
| 2008/0120185 | A1 | 5/2008 | Evans |
| 2008/0183577 | A1 | 7/2008 | Evans |
| 2008/0215467 | A1 | 9/2008 | Huffman |
| 2008/0265020 | A1 | 10/2008 | Copeland |
| 2009/0069911 | A1 | 3/2009 | Stefik |
| 2009/0158318 | A1 | 6/2009 | Levy |
| 2009/0234710 | A1 | 9/2009 | Belgaied Hassine |
| 2011/0258049 | A1 | 10/2011 | Ramer |
| 2011/0295722 | A1 | 12/2011 | Reisman |
| 2012/0054666 | A1 | 3/2012 | Baird-Smith |
| 2012/0179556 | A1 | 7/2012 | Ertas |
| 2012/0190386 | A1 | 7/2012 | Anderson |
| 2012/0272278 | A1* | 10/2012 | Bedi ............... H04N 21/25435 725/105 |
| 2012/0278725 | A1 | 11/2012 | Gordon |
| 2012/0311462 | A1 | 12/2012 | Devecka |
| 2013/0080328 | A1 | 3/2013 | Royyuru |
| 2013/0197979 | A1 | 8/2013 | Han |
| 2013/0226691 | A1 | 8/2013 | Chatow |
| 2013/0275429 | A1 | 10/2013 | York |
| 2014/0025473 | A1 | 1/2014 | Cohen |
| 2014/0032326 | A1 | 1/2014 | Li |
| 2014/0067554 | A1 | 3/2014 | Heppding |
| 2014/0067702 | A1 | 3/2014 | Rathod |
| 2014/0122507 | A1 | 5/2014 | Zeng |
| 2014/0164049 | A1 | 6/2014 | Yakos |
| 2014/0164514 | A1 | 6/2014 | Eteminan |
| 2014/0214641 | A1 | 7/2014 | Acker, Jr. |
| 2014/0280121 | A1 | 9/2014 | Sharp |
| 2014/0324604 | A1 | 10/2014 | Munoz Torres |
| 2014/0366047 | A1* | 12/2014 | Thomas ............... H04N 21/472 725/5 |
| 2015/0066189 | A1* | 3/2015 | Mulligan ........... G06Q 30/0621 700/136 |
| 2015/0066675 | A1 | 3/2015 | Camelio |
| 2015/0161692 | A1 | 6/2015 | Tembo |
| 2015/0193889 | A1 | 7/2015 | Garg |
| 2015/0363899 | A1 | 12/2015 | Krause |
| 2016/0071058 | A1 | 3/2016 | Galuten |
| 2016/0080485 | A1 | 3/2016 | Hamedi |
| 2016/0124918 | A1 | 5/2016 | Ying |
| 2016/0189198 | A1 | 6/2016 | McKenzie |
| 2016/0210650 | A1 | 7/2016 | Sewell |
| 2016/0232480 | A1 | 8/2016 | Erez |
| 2016/0357376 | A1 | 12/2016 | Carrigan |
| 2017/0076348 | A1 | 3/2017 | Jennings |
| 2017/0083930 | A1 | 3/2017 | Nagaraj |
| 2017/0161794 | A1 | 6/2017 | Zhu |
| 2017/0337621 | A1 | 11/2017 | Peters |
| 2018/0040019 | A1 | 2/2018 | Gavlovski |
| 2018/0075147 | A1 | 3/2018 | Bagheri |
| 2018/0121973 | A1 | 5/2018 | Dimascio |
| 2018/0144052 | A1 | 5/2018 | Sayyadi-Harikandehei |
| 2018/0365709 | A1 | 12/2018 | Modani |
| 2019/0026280 | A1 | 1/2019 | Aviyam |
| 2019/0026782 | A1 | 1/2019 | McGrath |
| 2019/0164082 | A1 | 5/2019 | Wu |
| 2019/0290965 | A1 | 9/2019 | Oren |
| 2019/0361577 | A1* | 11/2019 | Burns ............... H04L 65/61 |
| 2020/0007934 | A1 | 1/2020 | Ortiz |
| 2020/0020014 | A1 | 1/2020 | Jin |
| 2020/0089724 | A1 | 3/2020 | Zimovnov |
| 2020/0134696 | A1 | 4/2020 | Lardeux |
| 2020/0219025 | A1 | 7/2020 | Conte |
| 2020/0219114 | A1 | 7/2020 | Wood |
| 2020/0300538 | A1 | 9/2020 | Avakian |
| 2020/0311751 | A1 | 10/2020 | Shi |
| 2020/0320571 | A1 | 10/2020 | Singh |
| 2021/0133651 | A1 | 5/2021 | Conte |
| 2021/0133775 | A1 | 5/2021 | Wood |
| 2021/0158317 | A1 | 5/2021 | Kurylko |
| 2021/0192460 | A1 | 6/2021 | Xu |
| 2022/0156781 | A1 | 5/2022 | Brini |
| 2022/0277356 | A1 | 9/2022 | Russo |
| 2022/0318704 | A1 | 10/2022 | Brini |
| 2023/0153840 | A1 | 5/2023 | Wood |
| 2023/0162118 | A1 | 5/2023 | Conte |
| 2023/0206154 | A1 | 6/2023 | Brini |

OTHER PUBLICATIONS

Ondrejka, Cory, "Escaping the gilded cage: User created content and building the metaverse", 49 N.Y.L. Sch. L. Rev. 81 (2004). (Year: 2004) (23 pages).
Vanderhoef, II, Robert John, et. al., "An Industry of Indies: The New Cultural Economy of Digital Game Production", University of California, Santa Barbar, Sep. 2016, pp. 1-259. (Year: 2016).
J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.
Wilson et al., Real World Applications of Machine Learning Techniques over Large Mobile Subscriber Datasets, SE4ML: Software Engineering for Machine Learning , 9 pages, Arxiv ID: 1502.02215 Publication Date: Feb. 8, 2015 (Year: 2015).
F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).
L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).
Investing in Games With Fig Game Shares,Feb. 28, 2019, fig.co, 12 pages, https://www.fig.co/invest#rewards-based-crowdfunding ( Year: 2019)
Gerri Detweiler, Reward Crowdfunding, Mar. 20, 2020, Nav, 11 pages, https://www.nav.com/business-financing-options reward-crowdfunding/ (Year: 2020).
Massimiliano Barbi and Marco Bigelli, Crowdfunding practices in and outside the US, Jun. 2017, 47 pages, ResearchGate DOI: 10.1016/ j.ribaf.2017.05.013 (Year: 2017).
Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 15-18, 2009 (Year: 2009).
Harris, William. "26 Inexpensive Customer Delight Ideas Worth Trying to Fuel Business Growth" Sellbrite, Jun. 2016, https:///ww.sellbrite.com/blog/customer-delight/(Year: 2016).
Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016).

(56) References Cited

OTHER PUBLICATIONS

Miller, Nicole. "Inside Buffer's Community Delight Headquarters: How and Why We Send Swag and What It All Costs" Buffer, Apr. 27, 2015, https://buffer.com/resources/community-delight/ (Year: 2015).

Shipwire. "Marketing inserts" Shipwire support, Feb. 27, 2015, https://www.shipwire.com/w/support/marketing-inserts/ (Year: 2015).

Yarbro, Printify Vs. Printful: Pros and Cons, Dec. 9, 2019, nomadicwander, https://nomadicwander.com/2019/12/09. printify-vs-printful-pros-and-cons/ (Year:2019).

Content and conduit: Relative profitability in the new era of television Todreas, Timothy Michael. ProQuest Dissertations and Theses, ProQuest Dissertations Publishing. (1996) (Year: 1996) 431 pages.

Author(s):Osuala Title: Impact of subscription based crowdfunding on creators online channels Journal: ERF [online]. Publication date: 2019.[retrieved on: Feb. 23, 2023 ]. Retrieved from the Internet: < URL: https://aisel.aisnet.org/cgi/viewcontent.cgi?article=1017& context=amcis2019> (Year: 2019).

Iulia, "9 social media apps paying their content creators", May 16, 2021 (Year: 2021) 4 pages.

Perez, "Watchworthy's personalized TV recommendation app will help you find your next binge", Mar. 24, 2020 (Year: 2020) 4 pages.

* cited by examiner

SYSTEMS AND METHODS TO FACILITATE QUALITY CONTROL OF BENEFIT ITEMS CREATED FOR SUBSCRIBERS OF A MEMBERSHIP PLATFORM

FIELD

The disclosure relates to systems and methods to facilitate quality control of benefit items created for subscribers of a membership platform.

BACKGROUND

Different platforms may be utilized by entities seeking contributions from the general public to obtain a needed service(s) and/or resource(s). Some of these platforms facilitate raising resources (i.e., funds) from the users through monetary contributions or donations to support a project. Oftentimes, supporters of a project are given rewards or special perks, where the size and/or quality of the rewards or special perks may depend on the amount contributed.

SUMMARY

A membership platform may be comprised of users including one or more of content creators, subscribers, and/or other users. Content creators may be users of the membership platform who offer content (also referred to as "benefit items") to subscribers in exchange for consideration. A "benefit item" may refer to a good and/or service. A good may comprise a physical good and/or a digital good (e.g., "online" content). In some implementations, subscribers may donate funds to a content creator such that the benefit item may be the altruism in supporting the content creator. Subscribers may be users of the membership platform who subscribe, through payment of a one-time and/or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, content types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

The present disclosure addresses one or more problems in controlling the quality of benefit items given to subscribers. A content creator may want to give benefit items to their subscribers in the form of physical benefit items. The physical benefit items may include personalized and/or customized merchandise. By way of non-limiting illustration, a physical benefit item may include an article of clothing (e.g., a t-shirt) having a logo (or other design component) of the content creator printed thereon. To create the physical benefit item, the content creator may first upload a digital asset representing the logo onto a computer program. The content creator may then design the merchandise on the computer by specifying one or more of placement of the logo on a digital mock-up of the physical benefit item, size of the logo on the digital mock-up of the physical benefit item, orientation of the logo on the digital mock-up of the physical benefit item, and/or other features of logo on the digital mock-up of the physical benefit. The design may then be sent to a fulfillment system (e.g., manufacturer) to create the merchandise. This may include, for example, printing the logo on the t-shirt. A problem addressed herein may be related to the resulting quality of the logo as it may appear on the actual physical benefit item once created. For example, the resolution of these digital assets, when printed on the merchandise, may not match the same quality when viewed on a computer. This issue may not be known to the content creator until the merchandise is already prepared and paid for. The content creator must then either eat their loses to make new merchandise, or reluctantly send the poor quality item.

One or more implementations presented herein may propose a way to control the quality of physical benefit items being sent to subscribers based on subscribership information and/or other information. Different levels of quality may be associated with different sets of subscribership criteria. When the subscribership information of a subscribers satisfies a given set of criteria, the system may only allow physical benefit items to be sent that meet or exceed an associated level of quality. By knowing the quality of designs component (e.g., represented by the digital asset) as they may appear on the actual merchandise item ahead of time, content creators will know whether or not it is worth it to produce the merchandise. Further, a given quality level may be associated with a given rank, total lifetime pledge, etc., and/or other subscribership information. The system may then automatically assign the physical benefit items of given quality levels to subscribers who satisfy the criteria for that quality level. Subscribers may be incentivized to increase the tier in order to get higher quality items.

One aspect of the present disclosure relates to a system configured to facilitate quality control of benefit items created for subscribers of a membership platform. The system may include one or more hardware processors configured by machine-readable instructions and/or other components. The machine-readable instructions may include one or more computer program components. The computer program components may include one or more of a subscribership component, an interface component, a criteria component, a fulfillment component, and/or other computer program components.

The subscribership component may be configured to obtain subscribership information for content creators of a membership platform. The content creators may offer benefit items to subscribers of the membership platform who subscribe to the content creators in exchange for consideration. The benefit items may include physical benefit items. The subscribership information may characterize subscribership of individual subscribers to individual content creators.

The subscribership component may be further configured to obtain quality control information for the physical benefit items, and/or other information. The quality control information may specify sets of subscribership criteria that correspond to different levels of quality of digital assets that may define design components of the physical benefit items. The sets of subscribership criteria may include the subscribership information that correlates the subscribers to the different levels of quality. By way of non-limiting illustration, the quality control information may include a first set of subscribership criteria corresponding to a first quality level and a second set of subscribership criteria corresponding to a second quality level.

The interface component may be configured to effectuate presentation of a reward fulfillment user interface on computing platforms associated with the content creators. The reward fulfillment user interface may facilitate specification of the physical benefit items.

The interface component may be further configured to obtain input information conveying input by the content creators through the reward fulfillment user interface. The input may include the digital assets and/or other information. By way of non-limiting illustration, the input by a first content creator may include a first digital asset that defines design component(s) of one or more of the physical benefit items.

The criteria component may be configured to calculate the level of quality of the digital assets. By way of non-limiting illustration, a quality level of the first digital asset is the first quality level. The levels of quality may include a resolution quality related to how the digital assets may appear on the physical benefit items. By way of non-limiting illustration, the resolution quality related to how the digital assets will appear on the physical benefit items may include a dots-per-inch (DPI) value.

The criteria component may be further configured to determine, from the quality control information, the sets of subscribership criteria that correspond to calculated ones of the levels of quality of the digital assets input by the content creators. By way of non-limiting illustration, the first set of subscribership criteria may be determined to correspond to the first quality level of the first digital asset.

The fulfillment component may be configured to authorize fulfillment of the physical benefit items to the subscribers at the different levels of quality based on the subscribership information of the subscribers satisfying the sets of subscribership criteria for the different levels of quality. By way of non-limiting illustration, fulfillment of the one or more of the physical benefit items having the design component(s) defined by the first digital asset may be authorized for a first set of subscribers to the first content creator. The first set of subscribers may have the subscribership information that satisfies the first set of subscribership criteria. By way of non-limiting illustration, fulfillment of the one or more of the physical benefit items having the design component(s) defined by the first digital asset may be denied for a second set of subscribers to the first content creator. The second set of subscribers may have the subscribership information that does not satisfy the first set of subscribership criteria.

As used herein, any association (or relation, or reflection, or indication, or correspondence) involving servers, processors, remote computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
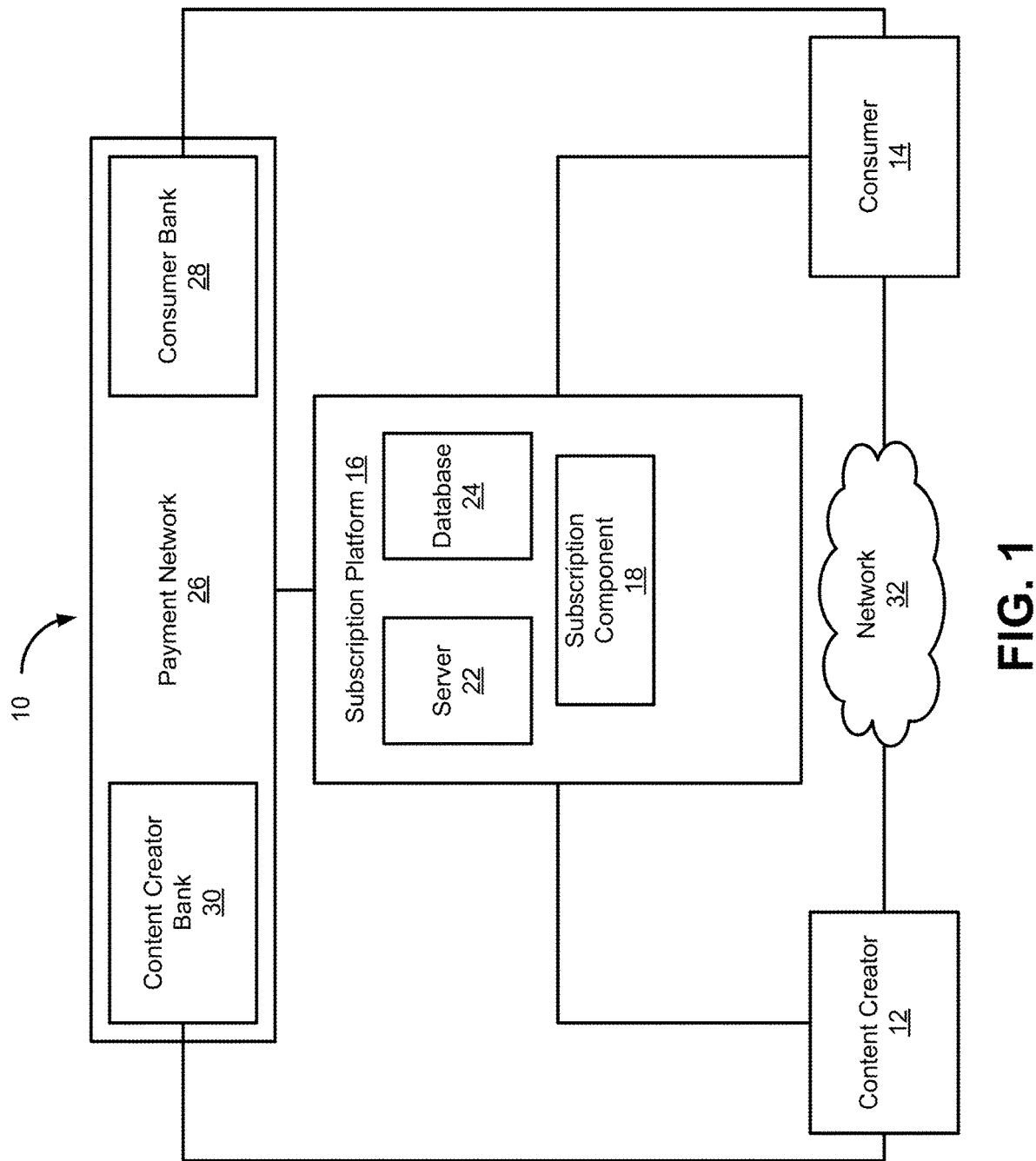
FIG. 1 illustrates an example membership system.

Some entities may seek to obtain funds through subscriptions. Such entities may utilize online membership platforms that allow consumers to sign up for ongoing payments in exchange for rewards and/or other membership benefits. Entities seeking funding may be content creators, for example, artists, musicians, educators, speakers, etc. Content creators may create content, which may refer to one or more of information, experiences, products, and/or other content provided to an audience or end-user, whether it be digital, analog, virtual, and/or other form. For example, types of content may include but is not limited to online content such as video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator on a recurring (e.g., weekly or monthly) basis and/or per piece of content created by the content creator. Content creators may interact with subscribers and/or prospective subscribers (e.g., consumers that show interest in the content created by content creators) in a variety of ways.

The content creators may want to send benefit items to their subscribers. The benefit items may differ from the ongoing or recurring benefits the subscribers may receive by virtue of their subscribership. One or more implementations presented herein may facilitate the quality control of benefit items created for subscribers. A content creator may want to give benefit items to their subscribers in the form of physical benefit items. The physical benefit items may include personalized and/or customized merchandise. The content creator may then design the merchandise on the computer by specifying one or more of placement of digital assets on a digital mock-up of the physical benefit item, size of the digital assets on the digital mock-up of the physical benefit item, orientation of the digital assets on the digital mock-up of the physical benefit item, and/or other features of logo on the digital mock-up of the physical benefit. In some implementations, the resulting quality of these digital assets, when printed on the physical benefit item, may not match the same quality when viewed on a computer. One or more implementations of the system 100 presented herein may propose a way to control the quality of physical benefit items being sent to subscribers based on subscribership information and/or other information. Different levels of quality may be associated with different sets of subscribership criteria. When the subscribership information of a subscribers satisfies a given set of criteria, the system may only allow physical benefit items to be sent that meet or exceed an associated level of quality. By knowing the quality of designs component (e.g., represented by the digital asset) as they may appear on the actual merchandise item ahead of time, content creators will know whether or not it is worth it to produce the merchandise. Further, a given quality level may be associated with a given rank, total lifetime pledge, etc., and/or other subscribership information.

FIG. 1 illustrates an example subscriber-based membership system 10 (sometimes referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, subscribership information, subscription level information specifying desired and/or initial subscription levels, preferred revenue source information (e.g., preferred currency, currency source, and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber") may set up a subscriber account with subscription platform 16. In setting up the subscriber account, consumer 14 may input demographic information relevant to consumer 14 (e.g., age, income, job, etc.), and/or other information. Information identifying consumer 14 (e.g., name, a picture, a phone number, etc.) and/or other information may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of benefit items including online content, physical content, and/or other content. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may be associated with one or more of subscribership information, content information, creator profile information, creation information, and/or other information. The content creator 12 may be able to change (e.g., add, delete, update, modify, etc.) such information. Such changes may be input via subscription component 18 and reflected in its local memory and/or database 24. It should be understood that content creator 12 and/or consumer 14 may be an individual or some entity representative of an individual or group of individuals.

Content information may characterize benefit items that content creator 12 creates. The content information may include information defining and/or describing one or more of the type of benefit items created, the medium in which the benefit items is created and/or presented, the amount of benefit items created, and/or the frequency at which the benefit items is created. For example, type of benefit items and/or medium may indicate that content creator 12 creates paintings on canvas, develops video games for a mobile platform, performs in online musical performances, and/or other information. Amount may reflect that content creator 12 created a series of artwork comprising four paintings. Content frequency information may indicate that content creator 12 develops three video games over the course of six months. Such information may be stored in content database 24.

In some implementations, the subscribership information may characterize the subscribership of the individual subscribers to individual content creators. The subscribership information may include one or more of length of subscribership the individual subscribers to individual content creators, date of initial subscribership the individual subscribers to individual content creators, a subscription level the individual subscribers, rank among other subscribers to individual content creators, lifetime contribution amount the individual subscribers, identifying information of the individual subscribers, subscriber-initiated interactions, and/or other information. The identifying information of the individual subscribers may include one or more of name, username, demographics, email, and/or other information identifying an individual subscriber. The subscriber-initiated interactions may be characterized based on one or more of content of the interactions, form of the interactions, point in time of the interactions, and/or other information. The content of the interactions may include what was communicated. The form of interactions may indicate how the communication was made. By way of non-limiting illustration, communication may be made by one or more of chat, comments, posting of forum or message board, phone call, video chat, and/or other forms of communication.

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
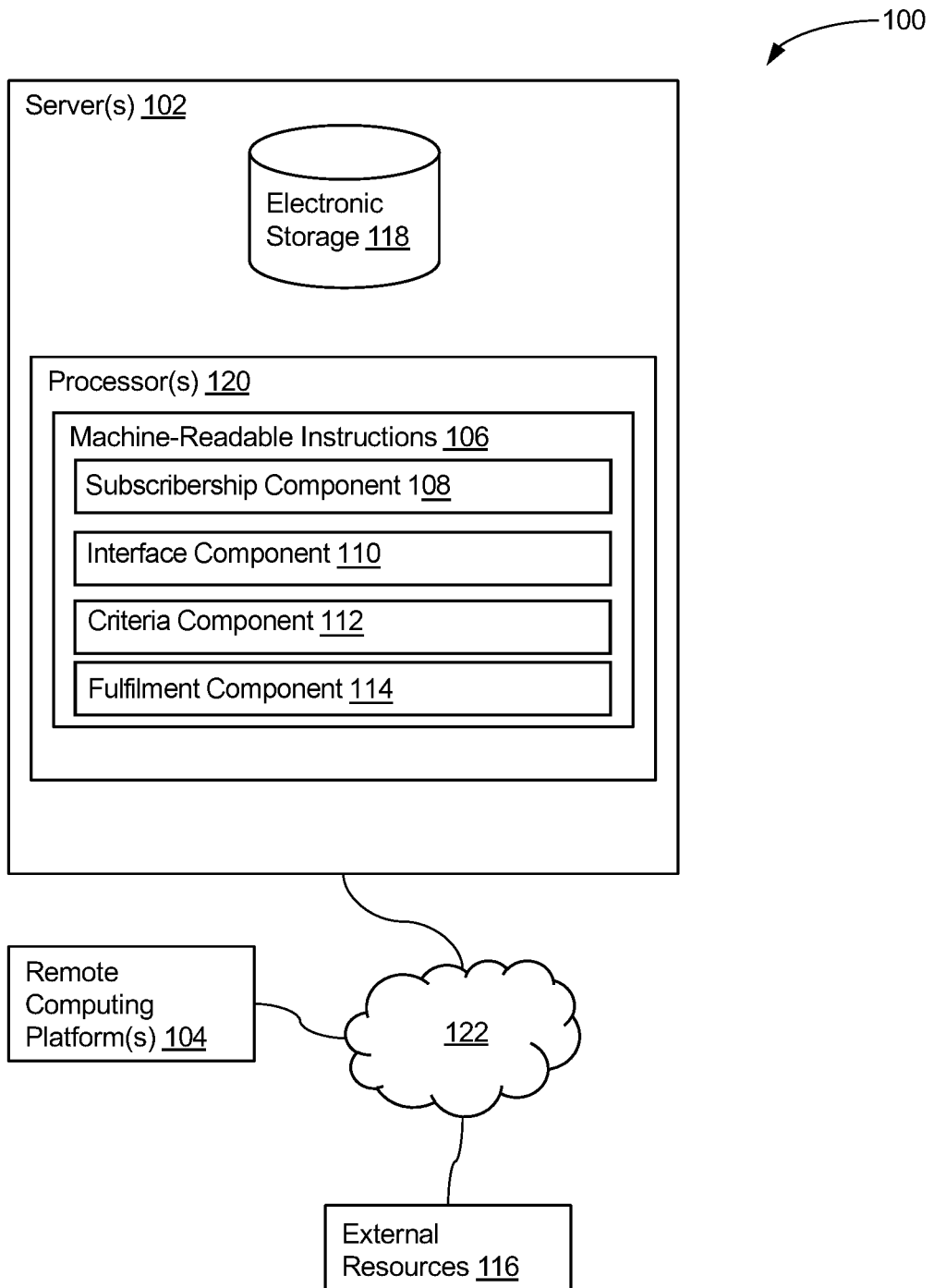
FIG. 2 illustrates a system configured to facilitate quality control of benefit items created for subscribers of a membership platform, in accordance with one or more implementations.

FIG. 2 illustrates a system 100 configured to facilitate quality control of benefit items created for subscribers of a membership platform. In some implementations, system 100 may include one or more of server(s) 102, remote computing platform(s) 104, and/or other components. The terms remote computing platform, client computing platform, and/or computing platform may be used interchangeably herein to refer to individual ones of the remote computing platform(s) 104. Server(s) 102 may be configured to communicate with one or more remote computing platforms 104 according to a client/server architecture and/or other architectures via one or more network(s) 122. In some implementations, one or more network(s) 122 may include the Internet and/or other networks. Remote computing platform(s) 104 may be configured to communicate with other remote computing platforms via server(s) 102 and/or according to a peer-to-peer architecture, a client-server architecture, and/or other architectures. Users may access system 100 via remote computing platform(s) 104.

It is noted the system 100 of FIG. 2 may be the same as, or included as part of, the system 10 shown in FIG. 1. For example, the server(s) 102 may be the same as or included in server 22. Network(s) 122 may be the same as or included in network 32. Individual remote computing platforms of one or more remote computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. The computer program components may include one or more of a subscribership component 108, an interface component 110, a criteria component 112, a fulfillment component 114, and/or other computer program components.

Subscribership component 108 may be configured to obtain subscribership information for content creators of a membership platform. The content creators may offer benefit items to subscribers of the membership platform who subscribe to the content creator in exchange for consideration. The benefit items may include one or more of physical benefit items, virtual benefit items, and/or other forms of reward. The subscribership information may characterize subscribership of individual subscribers to individual content creators. In some implementations, the physical benefit items may include physical merchandise. Physical merchandise may include one or more of articles of clothing, artwork, gift items (e.g., coasters, bottle openers, stickers, and/or other objects), and/or other physical merchandise. The physical benefit items may include one or more design components and/or elements of the physical benefit items. This may include printing, forming, embroidering, etching, and/or other forms of manufacture. The one or more design components and/or elements of the physical benefit items may be defined by digital assets. By way of non-limiting illustration, the digital assets may define one or more of logos, images, pictures, graphics, and/or other components. The digital assets may comprise digital files, digital renderings, and/or other assets. By way of non-limiting illustration, a digital asset of a logo may comprise a JPEG file, and/or other information.

Subscribership component 108 may be further configured to obtain quality control information for the physical benefit items. The quality control information may specify sets of subscribership criteria that may correspond to different levels of quality of digital assets. In some implementations, the levels of quality may be resolution quality. The resolution quality may be related to how the digital assets may appear on the physical benefit items. The resolution quality related to how the digital asset will appear on the physical benefit items may be a dots-per-inch (DPI) value, and/or other metrics of quality.

The sets of subscribership criteria may include the subscribership information that correlates the subscriber to the different levels of quality. In some implementations, subscribership information conveying relatively higher engagement may correlate a subscriber to relatively a higher level of quality. In some implementations, engagement may be measured based on one or more of length of subscribership, date of initial subscribership, rank among other subscribers, lifetime contribution amount the individual subscribers, subscriber-initiated interactions, and/or other information. By way of non-limiting illustration, relatively higher engagement may be measured based on one or more of relatively longer length of subscribership, relatively earlier date of initial subscribership, relatively higher rank among other subscribers, relatively higher lifetime contribution amount the individual subscribers, relatively more subscriber-initiated interactions, and/or other information.

By way of non-limiting illustration, the quality control information may include one or more of a first set of subscribership criteria corresponding to a first quality level, a second set of subscribership criteria corresponding to a second quality level, and/or other information. By way of non-limiting illustration, the first set of subscribership criteria may correspond to a first subscription level, and the second set of subscribership criteria may correspond to a second subscription level. If the first subscription level is a higher level than the second subscription level, the first quality level may be higher than the second quality level. By way of non-limiting illustration, the first set of subscribership criteria may correspond to a first lifetime contribution amount, and the second set of subscribership criteria may correspond to a second lifetime contribution amount. If the first lifetime contribution amount is a higher level than the second lifetime contribution amount, the first quality level may be higher than the second quality level. By way of non-limiting illustration, the first set of subscribership criteria may correspond to a first amount of subscriber-initiated interactions, and the second set of subscribership criteria may correspond to a second amount of subscriber-initiated interactions. If the first amount of subscriber-initiated interactions is a higher level than the second amount of subscriber-initiated interactions, the first quality level may be higher than the second quality level.

Interface component 110 may be configured to effectuate presentation of a reward fulfillment user interface on computing platforms associated with the content creators. The reward fulfillment user interface may facilitate specification of the physical benefit items. The specification of the physical benefit items may include one or more of selecting digital assets representing design components of the physical benefit times, configuring how the design components will appear on the physical benefit items, and/or other specifications.

Interface component 110 may be configured to obtain input information conveying input by the content creators through the reward fulfillment user interface. The input may include one or more of uploads of digital assets, identification of physical benefit times, identification of subscribers to send the physical benefit items, configurations of the physical benefit times including design components defined by the digital assets, and/or other information. In some implementations, the reward fulfillment user interface may be configured to allow content creators to configure the physical benefit times. By way of non-limiting illustration, the reward fulfillment user interface may display one or more of a virtual mock-up of a physical benefit item, an instance of the digital asset, and/or other information.

The content creator may provide input into the reward fulfillment user interface to specify how the digital asset will appear on the virtual mock-up of the physical benefit item, which may correspond to how a real design may appear on the actual physical benefit item when created. By way of non-limiting illustration, content creator may provide input including one or more of relative dimensions of the digital assets on the mock-up, relative dimensions of a printing area on physical benefit item, sizing requirements of the digital assets, placement requirements of the digital assets on a physical benefit item, and/or other aspects of the digital assets and/or physical benefit item. In some implementations, the input by the content creator may include drag-and-drop input, resizing of the representations of the digital assets, and/or other input.

By way of non-limiting example, the input by a first content creator may include a first digital asset that defines the components of one or more of the physical benefit items. In some implementations, the input may further include identification of one or more of the subscribers to the first content creator.

Criteria component 112 may be configured to calculate the levels of quality of the digital assets input by the content creators. The levels of quality may be conveyed as a dots-per-inch (DPI) value, and/or other metrics of quality. In some implementations, calculating the levels of quality of the digital assets may be based on one or more of dimensions of the digital assets (e.g., as it will appear on a physical benefit item), dimensions of a printing area on a physical benefit item, sizing requirements of the digital assets, placement requirements of the digital assets on a physical benefit item, and/or other aspects of the digital assets and/or physical benefit item. By way of non-limiting illustration, criteria component 112 may calculate a quality level of the first digital asset as the first quality level.

Criteria component 112 may be further configured to determine, from the quality control information, the sets of subscribership criteria that correspond to calculated ones of the levels of quality of the digital assets input by the content creators. By way of non-limiting illustration, the first set of subscribership criteria may be determined to correspond to the first quality level of the first digital asset by virtue of the first set of subscribership criteria corresponding to the first quality level.

In some implementations, criteria component 112 may be configured to generate quality control notifications and/or other notifications. The quality control notifications may be based on the determination of the sets of subscribership criteria that correspond to the calculated ones of the levels of quality of the digital assets input by the content creators. The quality control notifications may include one or more of descriptions of the levels of quality calculated for the digital assets input by the content creators, descriptions of the sets of subscribership criteria determined to correspond to the calculated ones of the levels of quality of the digital assets input by the content creators, and/or other information. By way of non-limiting illustration, a first notification may be generated including a description of the first quality level of the first digital asset and a description of the first set of subscribership criteria.

In some implementations, interface component 110 may be configured to effectuate presentation of the quality control notifications in the reward fulfillment user interface presented on the computing platforms of the content creators. Accordingly, the content creators are able to determine which subscribers the physical benefit items should go to.

Fulfillment component 114 may be configured to authorize (and/or deny) fulfillment of the physical benefit items to the subscribers at the different levels of quality based on the subscribership information of the subscribers satisfying the sets of subscribership criteria for the different levels of quality. The fulfillment component 114 may provide an automated way to only allow physical benefit items to be sent to subscribers that meet or exceed an associated level of quality of the subscribers. Accordingly, a content creator may be denied from sending a benefit item falling below a given quality level to a subscriber who may be otherwise associated with a higher quality level.

By way of non-limiting illustration, fulfillment of the one or more of the physical benefit items having the components defined by the first digital asset may be authorized for a first set of subscribers to the first content creator having the subscribership information that satisfies the first set of subscribership criteria. Fulfillment of the one or more of the physical benefit items having the components defined by the first digital asset may be denied for a second set of subscribers to the first content creator having the subscribership information that does not satisfy the first set of subscribership criteria.

In some implementations, fulfillment component 114 may be further configured to effectuate communication of fulfillment instructions to a reward fulfillment system. The communication of fulfillment instructions may be initiated by content creators providing input into the reward fulfillment interface and/or into individual quality control notifications. In some implementations, a reward fulfillment system may comprise a system configured to effectuate the creation/manufacture of the physical benefit items. By way of non-limiting illustration, the reward fulfillment system may be configured to obtain fulfilment instructions to create/manufacture a physical benefit item, utilize the instructions to then create/manufacture the physical benefit item (e.g., manually and/or through machine intervention), pack the physical benefit item, ship the physical benefit item, and/or perform other operations. The reward fulfillment system may comprise one or both of automated computer tasks and/or instructions output to users via a computer prompting them to perform manual tasks.

The fulfillment instructions may cause the reward fulfillment system to create the physical benefit items using the digital assets at the different levels of quality for the subscribers having the subscribership information satisfying the sets of subscribership criteria for the different levels of quality. In some implementations, the fulfillment instructions may further include timing information. The timing information may dictate timing of creation and/or sending of the physical benefit items by the reward fulfillment system.

In some implementations, content creators may identify specific subscribers to send the physical benefit items (e.g., via input into the reward fulfillment interface). The fulfillment component 114 may be configured to obtain subscribership information related to the one or more of the subscribers identified in the input of the content creators through the reward fulfillment interface. In some implementations, fulfillment component 114 may be further configured to determine whether the subscribership information related to the one or more of the subscribers identified in the input satisfies the sets of subscribership criteria that correspond to the calculated ones of the levels of quality of the digital assets input by the content creators. This way, content creators may know the quality of designs component (e.g., represented by the digital asset) as they may appear on the actual merchandise item ahead of time, so they can determine whether or not it is worth it to produce the merchandise for the identified subscriber(s).

In some implementations, in response to determining the subscribership information related to the one or more of the subscribers identified in the input satisfies the sets of subscribership criteria that correspond to the calculated ones of the levels of quality of the digital assets input by the content creators, fulfillment component 114 may be configured to authorize fulfillment of the physical benefit items for the one or more of the subscribers identified in the input.

In some implementations, in response to determining the subscribership information related to the one or more of the subscribers identified in the input does not satisfy the sets of subscribership criteria that correspond to the calculated ones of the levels of quality of the digital assets input by the content creators, fulfillment component 114 may be configured to deny fulfillment of the physical benefit items for the one or more of the subscribers identified in the input.

In some implementations, criteria component 112 may be configured to generate quality control notifications in response to denying the fulfillment of the physical benefit items to one or more of the subscribers identified in the input. The quality control notifications may convey the denial of the fulfillment of the physical benefit items to the one or more of the subscribers. In some implementations, interface component 110 may be configured to effectuate presentations of the quality control notifications in the reward fulfillment user interface presented on the computing platforms of the content creators. In some implementations, in response to authorizing the fulfillment of the physical benefit items to one or more of the subscribers identified in the input, fulfilment component 114 may be configured to communicate fulfillment instructions to the reward fulfillment system.

Figure 5:
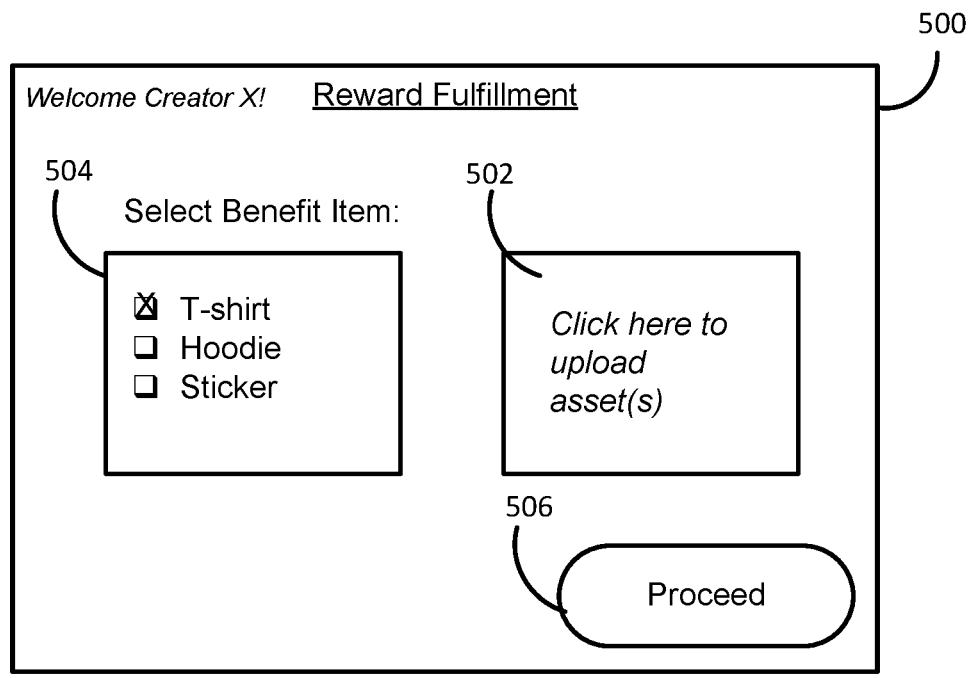
FIG. 5 illustrated a user interface, in accordance with one or more implementations.

FIG. 5 illustrates a reward fulfillment user interface 500, in accordance with one or more implementations. For illustrative purposes, the reward fulfillment user interface 500 represents presentation on a computing platform of a content creator, referred to as "Creator X." The reward fulfillment user interface 500 may be configured to receive user input defining input information. The user input by the content creator may include one or more of identification of a physical benefit item, a digital asset, and/or other information. By way of non-limiting illustration, a user interface element 502 may be presented that facilitates uploading a digital asset. By way of non-limiting illustration, a list 504 of available benefit items may be presented. An individual benefit item may be selected via selection of a check box, and/or other input. For illustrative purposes, Creator X has selected a physical benefit item that is a "T-shirt." The reward fulfillment user interface 500 may include a user interface element 506 to proceed to one or more further operations.

Figure 6:
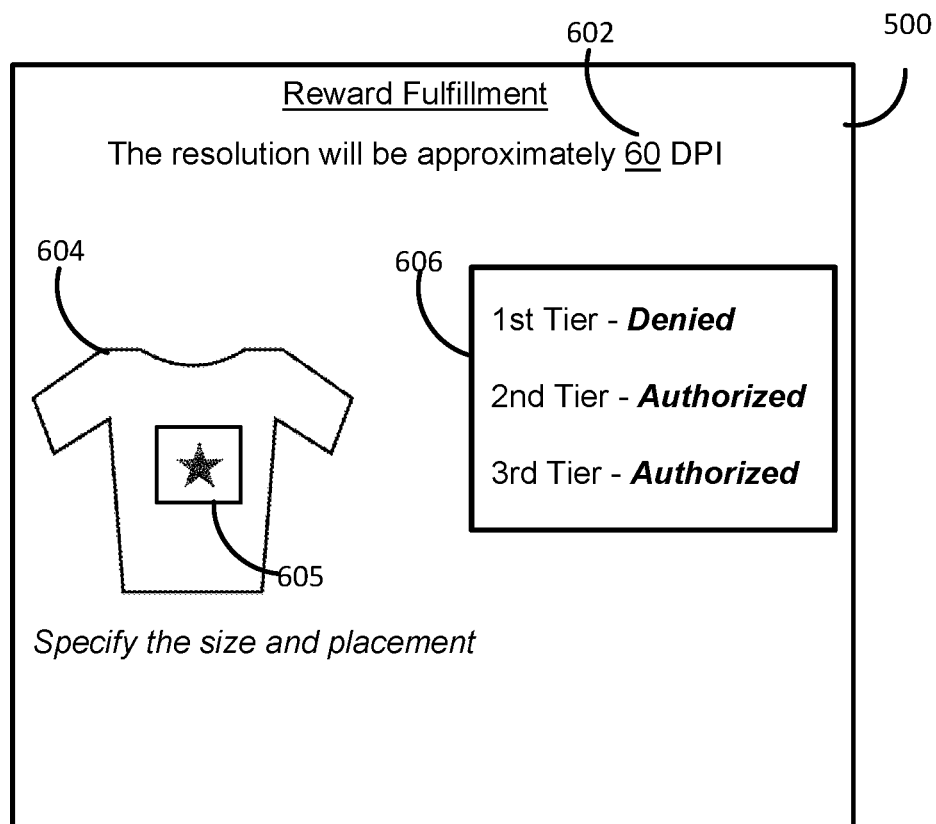
FIG. 6 illustrates a user interface, in accordance with one or more implementations.

FIG. 6 illustrates the reward fulfillment user interface 500, in accordance with one or more implementations. The reward fulfillment user interface 500 in FIG. 6 may include and/or comprise a quality control notification generated in response to one or more of the selection of a benefit item, upload of a digital asset, and/or other input into the reward fulfillment user interface 500 of FIG. 5. In particular, the reward fulfillment user interface 500 may display one or more of a description of a calculated level of quality 602 of the digital asset uploaded by Creator X in reward fulfillment user interface 500 of FIG. 5, a user interface element 606 displaying one or more of sets of subscribership criteria that correspond to the calculated level of quality and/or a description of whether the individual sets of subscribership criteria are authorized and/or denied for the calculated level of quality 602, and/or other information. For illustrative purposes, the sets of subscribership criteria are represented as different "tiers" of subscribership. In some implementations, the reward fulfillment user interface 500 may be configured to allow the content creator to configure the physical benefit item. By way of non-limiting illustration, the reward fulfillment user interface 500 may display one or more of a virtual mock-up 604 of a physical benefit item (e.g., T-shirt), an instance of the digital asset 605, and/or other information. The calculated level of quality may be updated as the user configures (e.g., moves, resizes, rotates, etc.) the instance of the digital asset 605 on the mock-up 604.

Figure 7:
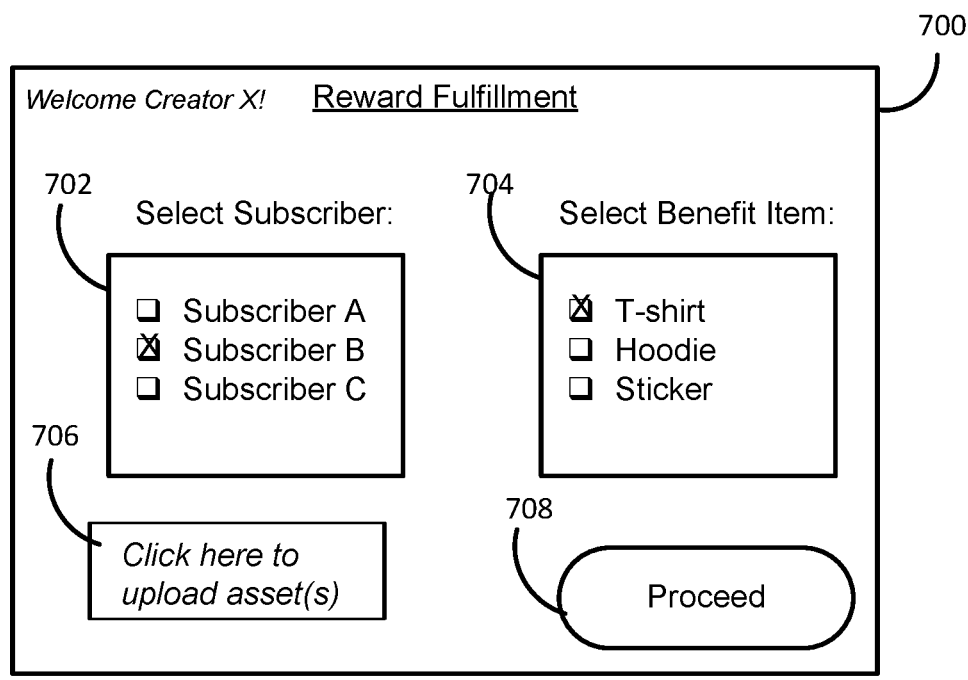
FIG. 7 illustrated a user interface, in accordance with one or more implementations.

FIG. 7 illustrates a reward fulfillment user interface 700, in accordance with one or more implementations. For illustrative purposes, the reward fulfillment user interface 700 represents presentation on a computing platform of a content creator, referred to as "Creator X." The reward fulfillment user interface 700 may be configured to receive user input defining input information. The user input by the content creator may include one or more of identification of a physical benefit item, a digital asset, identification of a subscriber, and/or other information. By way of non-limiting illustration, a user interface element 706 may be presented that facilitates uploading a digital asset. By way of non-limiting illustration, a list 704 of available benefit items may be presented. An individual benefit item may be selected via selection of a check box, and/or other input. For illustrative purposes, Creator X has selected a physical benefit item that is a "T-shirt." By way of non-limiting illustration, a list 702 of available subscribers may be presented. An individual subscriber may be selected via selection of a check box, and/or other input. For illustrative purposes, Creator X has selected "Subscriber B." The reward fulfillment user interface 700 may include a user interface element 708 to proceed to one or more further operations.

Figure 8:
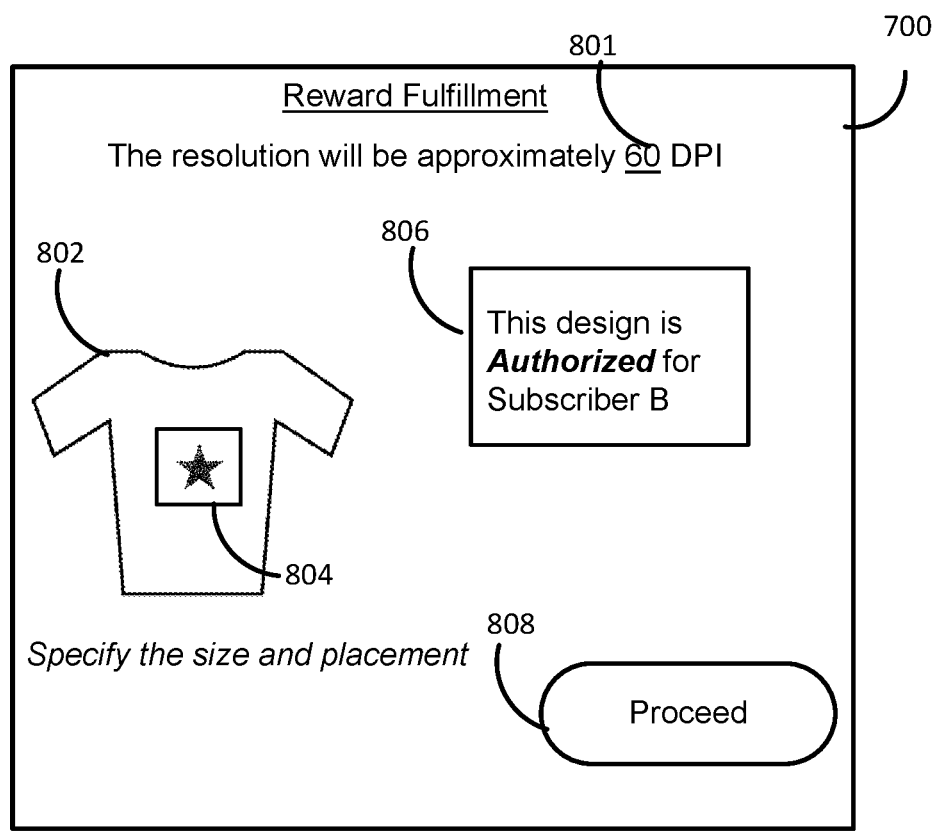
FIG. 8 illustrates a user interface, in accordance with one or more implementations.

FIG. 8 illustrates the reward fulfillment user interface 700, in accordance with one or more implementations. The reward fulfillment user interface 700 in FIG. 8 may include and/or comprise a quality control notification generated in response to one or more of the selection of a benefit item, selection of a subscriber, upload of a digital asset, and/or other input into the reward fulfillment user interface 700 of FIG. 7. In particular, the reward fulfillment user interface 700 may display one or more of a description of a calculated level of quality 801 of the digital asset uploaded by Creator X in reward fulfillment user interface 700 of FIG. 7, a user interface element 806 displaying a description of whether Subscriber B is authorized and/or denied for the calculated level of quality 801, and/or other information.

In some implementations, the reward fulfillment user interface 700 may be configured to allow the content creator to configure the physical benefit item. By way of non-limiting illustration, the reward fulfillment user interface 700 may display one or more of a virtual mock-up 802 of a physical benefit item (e.g., T-shirt), an instance of the digital asset 804, and/or other information. The calculated level of quality may be updated as the user configures (e.g., moves, resizes, rotates, etc.) the instance of the digital asset 804 on the mock-up 802. The reward fulfillment user interface 700 may include a user interface element 808 to proceed to one or more further operations. By way of non-limiting illustration, one or more further operations may include effectuating communication of fulfillment instructions to a reward fulfillment system and/or other operations.

Returning to FIG. 2, in some implementations, server(s) 102, remote computing platform(s) 104, and/or external resource(s) 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, remote computing platform(s) 104, and/or external resource(s) 116 may be operatively linked via some other communication media.

A given remote computing platform 104 may include one or more processors configured to execute one or more computer program components. The computer program components may be configured to enable an expert or user associated with the given remote computing platform 104 to interface with system 100, system 10, and/or external resource(s) 116, and/or provide other functionality attributed herein to remote computing platform(s) 104. By way of non-limiting example, the given remote computing platform 104 may include one or more of a desktop computer, a laptop computer, a handheld computer, a tablet computing platform, a NetBook, a Smartphone, a gaming console, and/or other computing platforms.

External resource(s) 116 may include one or more of sources of information outside of system 100, external entities participating with system 100, a reward fulfillment system, and/or other resources. In some implementations, some or all of the functionality attributed herein to external resource(s) 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from remote computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 2 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, and/or 112, and/or other components. Processor(s) 120 may be configured to execute components 108, 110, and/or 112, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 2 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112 and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 3:
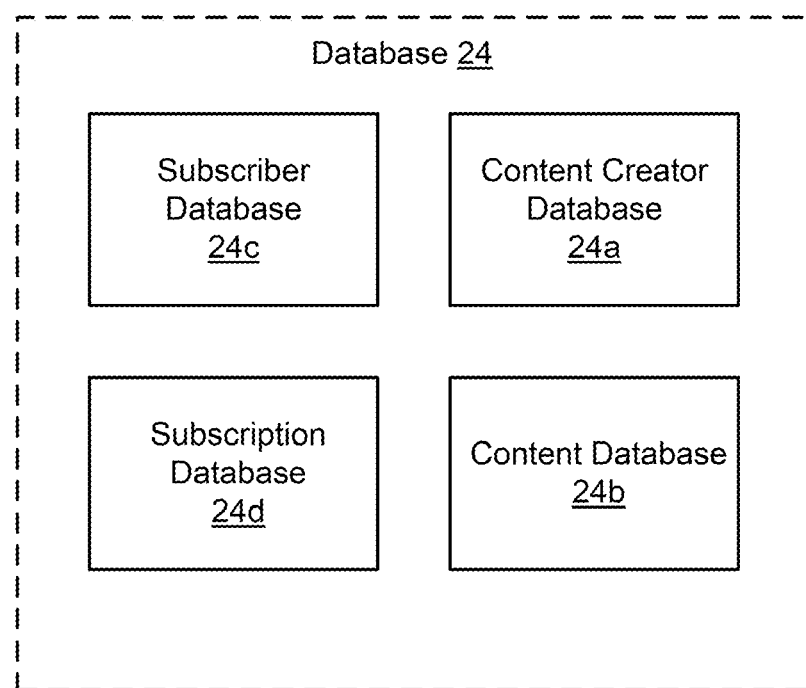
FIG. 3 illustrates an example database.

FIG. 3 illustrates elements that may make up database 24 of FIG. 1. As indicated previously, subscription component 18 of FIG. 1 may transmit information input by content creator 12 and/or consumer 14 regarding content information, subscribership information, and/or other information to database 24. Subscription platform 16, via server 22, for example, may monitor and obtain creation and/or subscribership information for storage in database 24. For example, subscription platform 16 may monitor and store additional information as well as performance-related subscribership information, e.g., engagement activity between content creator 12 and his/her subscribers, one of whom may be consumer 14. For example, subscription platform 16 of FIG. 1 may monitor the amount of money being generated and/or lost through the subscribers (e.g., outcome information), as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of content information, creator profile information, subscriber information, subscribership information, and/or other information.

Creator profile information characterizing content creator may be stored in content creator database 24a. The creator profile information may be information reflecting the creator type that content creator 12 designates him/herself to be and/or other self-identified preferences regarding subscription offerings by content creator 12. For example, content creator type may reflect that content creator may be a paint artist, a digital artist, a sculptor, a video game developer, a writer, a performance artist, etc. Content creator preferences may reflect subscription levels content creator 12 wishes to offer to subscribers. Content creator preferences may reflect, e.g., a desired minimum revenue, preferred sources of revenue, subscription level proportions, etc. For example, content creator preferences may include information indicating content creator's desire for more subscribers pledging some amount of money or less subscribers pledging a greater amount of money. For example, content creator preferences may include information specifying that content creator wishes to supplement his/her subscription-generated revenue with revenue generated from the sale of promotional merchandise.

In addition to content creation-related information, and upon registering with subscription platform as a content creator, content creator may input information characterizing the identity of content creator. For example, content creator may input or upload contact information, a telephone number associated with a personal user device, such as smartphone, an email address, a photograph, and/or other identifying information. Such identifying information may be used by subscription platform in a variety of ways to associate content creator with particular content, his/her webpage, payment of subscription donations, and/or other information.

Consumers may subscribe to content creators by registering with subscription platform. During registration, consumers may input certain subscriber demographic information indicative of economic and/or social characteristics. Subscriber demographic information may reflect the yearly income of consumers, a geographic area in which consumer resides, the age of consumer, interests of consumer, etc. Subscriber information may include data regarding the amount of money consumer is currently pledged to donate to one or more content creators. Over time, as monitored and collected by subscription platform, subscriber information may include information regarding the amount of money consumer has previously donated to one or more content creators. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creators, consumers may input or upload other identifying information. For example, a photograph or phone number of a consumer may be used. Such information may be stored in subscriber database 24c.

Subscription level information may refer to information characterizing different subscription levels and corresponding preferential access information specified by content creators. For example, subscription level information may reflect that a ten dollar recurring donation is rewarded with a high-resolution digital image of artwork created during that month to consumers. Such subscriber level information may be stored in subscription database 24d. Subscribership information may be stored in subscription database 24d and/or other storage location.

It should be noted that other databases or partitions may make up database 24. For example, database 24 may include one or more databases or partitions for storing information including, but not limited to the following: preferential access information characterizing activity in which content creator engagements may refer to data reflecting the type of activity, the level and/or exclusivity of preferential access to that activity granted to consumer; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 4:
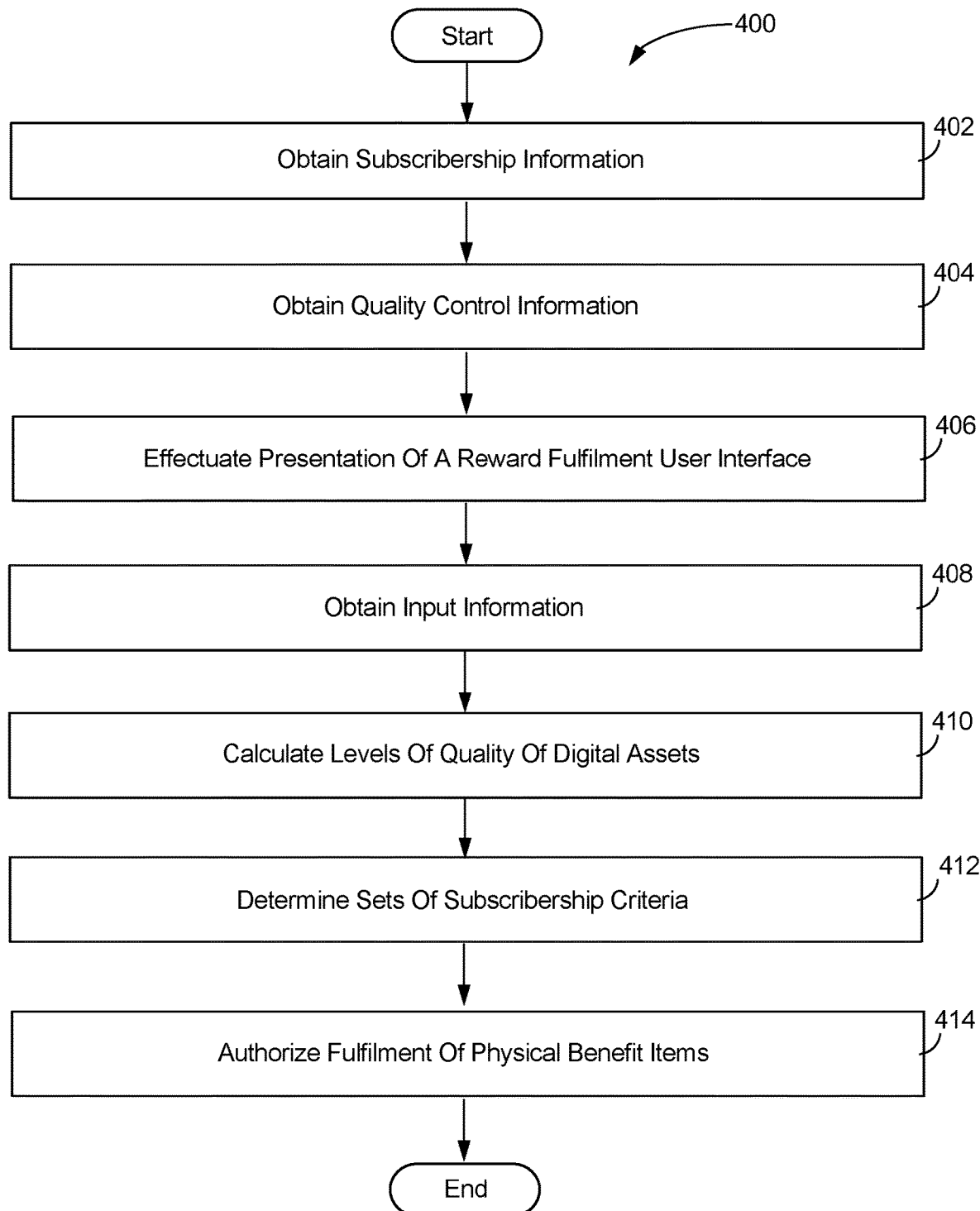
FIG. 4 illustrates a method to facilitate quality control of benefit items created for subscribers of a membership platform, in accordance with one or more implementations.

FIG. 4 illustrates a method 400 to facilitate quality control of benefit items created for subscribers of a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a physical processor, digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining subscribership information for content creators of a membership platform. The content creators may offer benefit items to subscribers of the membership platform who subscribe to the content creators in exchange for consideration. The benefit items may include physical benefit items. The subscribership information may characterize subscribership of individual subscribers to individual content creators. Operation 402 may be performed by one or more hardware processors configured by machine-readable instructions including a component that is the same as or similar to subscribership component 108.

An operation 404 may include obtaining quality control information for the physical benefit items. The quality control information may specify sets of subscribership criteria that correspond to different levels of quality of digital assets that define components of the physical benefit items. The sets of subscribership criteria may include the subscribership information that correlates the subscribers to the different levels of quality. By way of non-limiting illustration, the quality control information may include a first set of subscribership criteria corresponding to a first quality level and a second set of subscribership information corresponding to a second quality level. Operation 404 may be performed by one or more hardware processors configured by machine-readable instructions including a component that is the same as or similar to subscribership component 108.

An operation 406 may include effectuating presentation of a reward fulfillment user interface on computing platforms associated with the content creators. The reward fulfillment user interface may facilitate specification of the physical benefit items. Operation 406 may be performed by one or more hardware processors configured by machine-readable instructions including a component that is the same as or similar to interface component 110.

An operation 408 may include obtaining input information conveying input by the content creators through the reward fulfillment user interface. The input may include the digital assets. By way of non-limiting illustration, the input by a first content creator may include a first digital asset that defines the components of one or more of the physical benefit items. Operation 408 may be performed by one or more hardware processors configured by machine-readable instructions including a component that is the same as or similar to interface component 110.

An operation 410 may include calculating the levels of quality of the digital assets. By way of non-limiting illustration, a quality level of the first digital asset may be the first quality level. Operation 410 may be performed by one or more hardware processors configured by machine-readable instructions including a component that is the same as or similar to criteria component 112.

An operation 412 may include determining, from the quality control information, the sets of subscribership criteria that correspond to calculated ones of the levels of quality of the digital assets input by the content creators. By way of non-limiting illustration, the first set of subscribership criteria may be determined to correspond to the first quality level of the first digital asset. Operation 412 may be performed by one or more hardware processors configured by machine-readable instructions including a component that is the same as or similar to criteria component 112.

An operation 414 may include authorizing fulfillment of the physical benefit items to the subscribers at the different levels of quality based on the subscribership information of the subscribers satisfying the sets of subscribership criteria for the different levels of quality. By way of non-limiting illustration, fulfillment of the one or more of the physical benefit items having the components defined by the first digital asset may be authorized for a first set of subscribers to the first content creator having the subscribership information that satisfies the first set of subscribership criteria. Fulfillment of the one or more of the physical benefit items having the components defined by the first digital asset may be denied for a second set of subscribers to the first content creator having the subscribership information that does not satisfy the first set of subscribership criteria. Operation 414 may be performed by one or more hardware processors configured by machine-readable instructions including a component that is the same as or similar to fulfillment component 114.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A system configured to facilitate quality control of merchandise created for subscribers of a membership platform, the system comprising:
one or more physical processors configured by machine-readable instructions to:
obtain quality control information for physical merchandise offered to subscribers of a membership platform who subscribe to content creators in exchange for consideration, the quality control information specifying subscribership criteria that correspond to different levels of print resolution quality of the physical merchandise, the levels of print resolution quality being based on how digital assets that define components of the physical merchandise will physically appear on the physical merchandise after creation of the physical merchandise using the digital assets, the levels of print resolution quality being print resolutions of the digital assets appearing on the physical merchandise, wherein the subscribership criteria include subscribership characteristics of the subscribers that correlate the subscribers to the different ones of the levels of print resolution quality;
obtain input information conveying input of the digital assets by the content creators through a reward fulfilment user interface through which specification of the physical merchandise is facilitated;
calculate the levels of print resolution quality of the physical merchandise based on the digital assets input by the content creators through the reward fulfilment user interface by determining dots-per-inch (DPI) values;
determine, from the quality control information, the subscribership criteria that correspond to calculated ones of the levels of print resolution quality of the physical merchandise based on the digital assets input by the content creators; and
authorize fulfillment of the physical merchandise to the subscribers at the different ones of the levels of print resolution quality based on the subscribership characteristics of the subscribers satisfying the subscribership criteria for the different ones of the levels of print resolution quality.

2. The system of claim 1, wherein the one or more physical processors are further configured by the machine-readable instructions to:
generate quality control notifications conveying the calculated ones of the levels of print resolution quality of the physical merchandise based on the digital assets input by the content creators; and
effectuate presentation of the quality control notifications in the reward fulfillment user interface presented on computing platforms of the content creators.

3. The system of claim 1, wherein the input further includes identification of one or more of the subscribers, and wherein the one or more physical processors are further configured by the machine-readable instructions to:
obtain the subscribership characteristics related to the one or more of the subscribers;
determine whether the subscribership characteristics satisfy the subscribership criteria that correspond to the calculated ones of the levels of print resolution quality of the physical merchandise based on the digital assets input by the content creators;
in response to determining the subscribership characteristics satisfy the subscribership criteria, authorize the fulfillment of the physical merchandise for the one or more of the subscribers; and
in response to determining the subscribership characteristics do not satisfy the subscribership criteria, deny the fulfillment of the physical merchandise for the one or more of the subscribers.

4. The system of claim 3, wherein the one or more physical processors are further configured by the machine-readable instructions to:
in response to determining the subscribership characteristics do not satisfy the subscribership criteria, generate quality control notifications conveying denial of the fulfillment; and
effectuate presentation of the quality control notifications in the reward fulfillment user interface presented on computing platforms of the content creators.

5. The system of claim 1, wherein the one or more physical processors are further configured by the machine-readable instructions to:
obtain subscribership information for the content creators, the subscribership information including the subscribership characteristics of the subscribers to the content creators; and
effectuate presentation of the reward fulfilment user interface on computing platforms associated with the content creators.

6. The system of claim 1, wherein the physical merchandise include clothing.

7. The system of claim 1, wherein the one or more physical processors are further configured by the machine-readable instructions to:
effectuate communication of fulfillment instructions to a reward fulfillment system, wherein the fulfillment instructions cause the reward fulfillment system to create the physical merchandise using the digital assets at the different ones of the levels of print resolution quality.

8. The system of claim 7, wherein the fulfillment instructions further include timing information dictating timing of creation and/or sending of the physical merchandise by the reward fulfillment system.

9. The system of claim 1, wherein calculating the levels of print resolution quality of the physical merchandise based on the digital assets is based on one or more of dimensions of the digital assets, dimensions of a printing area on a physical merchandise, sizing requirements of the digital assets, or placement requirements of the digital assets.

10. A method to facilitate quality control of merchandise created for subscribers of a membership platform, the method comprising:
obtaining quality control information for physical merchandise offered to subscribers of a membership platform who subscribe to content creators in exchange for consideration, the quality control information specifying subscribership criteria that correspond to different levels of print resolution quality of the physical merchandise, the levels of print resolution quality being based on how digital assets that define components of the physical merchandise will physically appear on the physical merchandise after creation of the physical merchandise using the digital assets, the levels of print resolution quality being print resolutions of the digital assets appearing on the physical merchandise, wherein the subscribership criteria include subscribership characteristics of the subscribers that correlate the subscribers to the different ones of the levels of print resolution quality;
obtaining input information conveying input of the digital assets by the content creators through a reward fulfilment user interface through which specification of the physical merchandise is facilitated;
calculating the levels of print resolution quality of the physical merchandise based on the digital assets input by the content creators through the reward fulfilment user interface by determining dots-per-inch (DPI) values;
determining, from the quality control information, the subscribership criteria that correspond to calculated ones of the levels of print resolution quality of the physical merchandise based on the digital assets input by the content creators; and
authorizing fulfillment of the physical merchandise to the subscribers at the different ones of the levels of print resolution quality based on the subscribership characteristics of the subscribers satisfying the subscribership criteria for the different ones of the levels of print resolution quality.

11. The method of claim 10, further comprising:
generating quality control notifications conveying the calculated ones of the levels of print resolution quality of the physical merchandise based on the digital assets input by the content creators; and
effectuating presentation of the quality control notifications in the reward fulfillment user interface presented on computing platforms of the content creators.

12. The method of claim 10, wherein the input further includes identification of one or more of the subscribers, and wherein the method further comprises:
obtaining the subscribership characteristics related to the one or more of the subscribers;
determining whether the subscribership characteristics satisfy the subscribership criteria that correspond to the calculated ones of the levels of print resolution quality of the physical merchandise based on the digital assets input by the content creators;
in response to determining the subscribership characteristics satisfy the subscribership criteria, authorizing the fulfillment of the physical merchandise for the one or more of the subscribers; and
in response to determining the subscribership characteristics do not satisfy the subscribership criteria, denying the fulfillment of the physical merchandise for the one or more of the subscribers.

13. The method of claim 12, further comprising:
in response to the determining the subscribership characteristics do not satisfy the subscribership criteria, generating quality control notifications conveying denial of the fulfillment; and
effectuating presentation of the quality control notifications in the reward fulfillment user interface presented on computing platforms of the content creators.

14. The method of claim 10, further comprising:
obtaining subscribership information for the content creators, the subscribership information including the subscribership characteristics of the subscribers to the content creators; and
effectuating presentation of the reward fulfilment user interface on computing platforms associated with the content creators.

15. The method of claim 10, wherein the physical merchandise include clothing.

16. The method of claim 10, further comprising:
effectuating communication of fulfillment instructions to a reward fulfillment system, wherein the fulfillment instructions cause the reward fulfillment system to create the physical merchandise using the digital assets at the different ones of the levels of print resolution quality.

17. The method of claim 16, wherein the fulfillment instructions further include timing information dictating timing of creation and/or sending of the physical merchandise by the reward fulfillment system.

18. The method of claim 10, wherein the calculating the levels of print resolution quality of the physical merchandise based on the digital assets is based on one or more of dimensions of the digital assets, dimensions of a printing area on a physical merchandise, sizing requirements of the digital assets, or placement requirements of the digital assets.

\* \* \* \* \*